July 2, 1929.  J. ADAMS  1,719,742
SWITCH STRUCTURE
Filed March 19, 1926
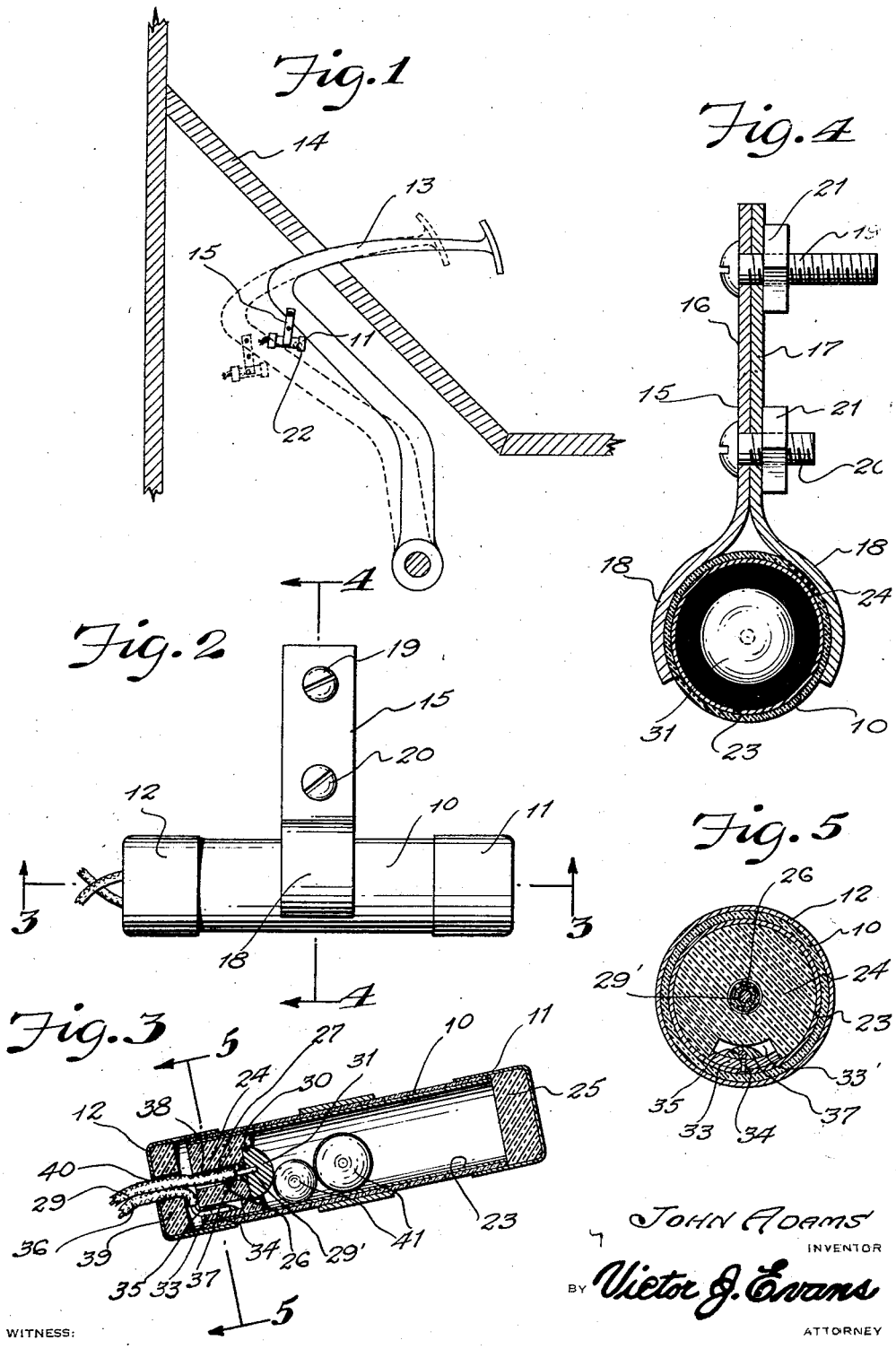
JOHN ADAMS
INVENTOR
BY Victor J. Evans
ATTORNEY
WITNESS:

Patented July 2, 1929.

1,719,742

UNITED STATES PATENT OFFICE.

JOHN ADAMS, OF ALBION, MICHIGAN.

SWITCH STRUCTURE.

Application filed March 19, 1926. Serial No. 95,972.

This invention relates to certain novel improvements in switch structures and more especially to a switch structure designed especially for use with a brake pedal of a vehicle for controlling the circuit of a stop light system and has for its principal object the provision of an improved construction of this character which will be highly efficient in use and economical in manufacture.

A further object of the invention is the production of a device of this character wherein there is provided a simple combination and arrangement of parts for assuring positive contact between the contact elements included in the circuit of a stop light system and wherein actuation of the contact elements is accomplished by gravity due to the relative position of the device in its association with a brake pedal of a vehicle whereby by reason of the gravity actuated contact elements sticking or fusing together of the contact elements is eliminated.

Other objects will appear hereinafter.

The invention consists in the combination and arrangement of parts hereinafter described and claimed.

The invention will be best understood by reference to the accompanying drawing, illustrating the preferred form of construction and in which, Fig. 1 is a side elevational view of the brake pedal illustrating the invention associated therewith, Fig. 2 is a side elevational view of the invention illustrating the same detached from the brake pedal, Fig. 3 is a sectional detail view of the same taken substantially on line 3—3 of Fig. 2, Fig. 4 is a sectional detail view of the same taken substantially on line 4—4 of Fig. 2, and Fig. 5 is a sectional detail view of the same taken substantially on line 5—5 of Fig. 3.

In accomplishing the various objects of the invention I provide a tube 10 open at both ends, which ends are normally closed by caps 11 and 12. This tube is formed of non-conductive material and is adapted for association with a brake pedal 13 of a vehicle 14. The tube is detachably connected to the brake pedal 13 through the medium of a clamp 15 including opposite clamping members 16 and 17 having end portions 18 curved to conform to the contour of the tube 10. These clamps, in the present instance, are secured together by means of screw members 19 and 20, including nuts 21. The screw member 19 is utilized for attaching the device to the brake pedal 13 in the manner illustrated in Fig. 1.

It is important to note that the brake pedal 13 when in neutral position carries the tube inclined in a horizontal plane with the inner end portion 22 thereof disposed in a rearwardly and downwardly direction, for reasons hereinafter understood.

The tube 10 is lined by an inner sleeve 23 formed of conductive material which is secured in proper position through the medium of a plug 24 formed of insulating material. The cap 11 closing the inner end 22 of the tube carries a filler plug 25 formed of non-conductive material and which cooperates with the plug 24 for retaining the inner sleeve in its proper position. This cap 11, as well as the cap 12 is adapted for frictional engagement with the tube 10. The plug 24 has formed therein a passage 26 for the passage of an end portion 27 of a conductor wire 29. The passage, as illustrated in the drawing, terminates at its inner end into a counter bore providing an enlarged recess 30 for the accommodation of an oval shaped conductor head 31. The end portion 29' of the conductor wire 29 is secured to this contact head through the medium of a solder 32 or other analogous material. This plug 24 further has formed in a side thereof a recess 33' within which is arranged a connecting strip 33 which is connected to the inner sleeve 23 through the medium of a rivet member 34. To this connecting strip is secured an end portion 35, of a conductor wire 36, through the medium of a solder 37 or other analogous material.

The conductor wires 29 and 36 lead from the tube 10 through a central passage 38 formed in a filler plug 39 confined in the cap 12. This passage 38 is in registration with an opening 40 formed in the cap 12, and through this opening extends the conductor wires 29 and 36.

The oval contact head 31 is adapted for engagement with pellets 41 which in the present instance are ball members formed of conductive material and confined in the inner sleeve 23 for rolling contact therewith and adapted for contact with the contact head 31 under certain conditions as will be hereinafter understood.

Having thus far described the preferred form of construction of my invention I will proceed to describe in detail the operation of the same.

As will be noted in Fig. 1 of the drawing the device illustrated in full lines shows the end portion 22 thereof disposed in an inwardly and downwardly direction. In this position the pellets 41 will be in engagement with the inner sleeve 23 and the filler plug 25 from contact with the contact head 31. As the brake pedal 13 is manipulated to apply the brakes of the vehicle the device will be moved forward to dispose its opposite end portion, that is the end portion opposite the end portion 22, in a position with this end portion extending downwardly and forwardly. In this position the pellets 41 are caused by gravity to roll forwardly in the inner sleeve 23 into contact with the contact head 31 thus completing the circuit between a suitable source of supply (not shown) and a stop light signal (not shown). As herein stated when the brake pedal is in neutral position the pellets 41 will be disposed rearwardly in the inner sleeve 23.

As clearly illustrated in the drawings the pellet disposed to close the circuit between the sleeve 23 and the contact 31 is of a diameter such that the periphery thereof will fit between the curved surface of the contact 31 and said sleeve so as to effectively close the circuit therebetween. It is therefore apparent that this pellet is of reduced size that therefore the other of the pellets 41 is provided which is of a larger diameter and which therefore embodies greater mass and therefore this larger pellet effectively forces the smaller pellet against the contact 31 so as to effectively close the circuit therebetween.

It is important to note that by operating the pellets 41 through gravity that the brake pedal can be manipulated a certain distance toward operation of the brakes before the pellets will, by gravity roll forwardly in the inner sleeve 23 into contact with the contact head 31. This is by reason of the fact that in order to move the pellets 41 toward the contact head 31 the forward end portion of the tube 10 must necessarily be disposed in a forward and downward position. In other words the device as herein claimed permits slight operation of the foot pedal without effecting rolling of the pellets, this slight operation of the foot pedal being necessary to slow down the travel of the vehicle.

While I have herein described and disclosed the invention as being associated with a foot pedal of a vehicle it is to be understood that the device is adapted for other uses without destroying the utility of the same.

While I have shown and described the preferred form of my invention, it is to be understood that various changes and alterations may be carried out in manufacture without departing from the spirit of the invention or the scope of the appended claims.

Having thus described the preferred form of my invention, what I claim as new and useful is:

1. The combination with two conductor wires, of a tubular member, a cap closing one end of the tubular member, a conductor sleeve confined in the tubular member and connected in circuit with one of the conductor wires, an insulating plug closing the opposite end of the sleeve, a closure cap at said opposite end of the sleeve and carried by the tubular member, an oval shape contact head carried by the insulating plug and connected in circuit with one of the conductor wires, and pellets confined in the conductor sleeve adapted for rolling movement into contact with the contact head.

2. The combination with two conductor wires, of a conductor sleeve connected in circuit with one of the conductor wires, a plug closing one end of said sleeve, a contact head carried by the plug and connected in circuit by the other of the conductor wires, a cap including insulating filler plug for closing the other end of said sleeve, a pair of pellets mounted for rolling movement in said sleeve, one of said pellets being adapted to engage said contact head so as to close the circuit between the said contact head and said sleeve the other of said pellets being of a greater diameter than said first named pellet and being adapted to hold said pellet in said circuit closing position.

3. The combination with two conductor wires, of a tubular member formed of insulating material, a cap closing one end of said tubular member, a conductor sleeve confined in the tubular member and connected in circuit with one of the conductor wires, an insulating plug disposed between the end of said conductor sleeve and said cap, an insulating plug at the opposite end of said sleeve, an oval shaped contact head carried by said last named insulating plug and disposed interiorally of said conductor sleeve, a closure cap closing the end of said tubular member adjacent said last named insulating plug, said oval shaped contact member being in circuit of the other of said conductor wires, a pellet confined in said sleeve adapted to close the circuit between said oval shaped contact head and said sleeve, said pellet being of a diameter such that it will fit between the curvature of said contact head and said sleeve, and another pellet confined in said sleeve and adapted to have a larger diameter than said first named pellet whereby to hold said second named pellet in engagement with said contact to close the circuit between said contact of said sleeve.

In testimony whereof I affix my signature.

JOHN ADAMS.